United States Patent
Kang et al.

(10) Patent No.: US 7,494,536 B2
(45) Date of Patent: Feb. 24, 2009

(54) METHOD FOR DETECTING A FAULT IN AN HVAC SYSTEM

(75) Inventors: Pengju Kang, Hartford, CT (US); Mohsen Farzad, Glastonbury, CT (US); Alan Finn, Hebron, CT (US); Payman Sadegh, Manchester, CT (US)

(73) Assignee: Carrier Corporation, Syracuse, NY (US)

( * ) Notice: Subject to any disclaimer, the term of this patent is extended or adjusted under 35 U.S.C. 154(b) by 454 days.

(21) Appl. No.: 11/028,805

(22) Filed: Jan. 4, 2005

(65) Prior Publication Data

US 2006/0144232 A1 Jul. 6, 2006

(51) Int. Cl.
*B01D 46/42* (2006.01)
*F24F 13/00* (2006.01)

(52) U.S. Cl. .............. 96/417; 96/26; 96/414; 96/117; 96/421; 55/DIG. 34; 116/268; 116/271; 116/DIG. 25; 62/198; 62/199; 62/200; 62/225; 62/227

(58) Field of Classification Search ............... 55/385.1, 55/DIG. 34; 96/417–423, 26, 414, 117, DIG. 34; 62/407, 506, 507, 198, 199, 200, 225, 227; 116/268, 271, DIG. 25

See application file for complete search history.

(56) References Cited

U.S. PATENT DOCUMENTS

| | | | | |
|---|---|---|---|---|
| 2,804,839 | A | * | 9/1957 | Hallinan ............... 116/112 |
| 3,027,865 | A | * | 4/1962 | Kautz et al. ............ 116/268 |
| 5,205,132 | A | * | 4/1993 | Fu ................. 62/208 |
| 5,353,603 | A | * | 10/1994 | Outlaw et al. .......... 62/149 |
| 7,244,294 | B2 | * | 7/2007 | Kates ............... 96/417 |
| 2005/0016193 | A1 | * | 1/2005 | Tarasinski et al. ....... 62/238.3 |
| 2005/0210910 | A1 | * | 9/2005 | Rigney et al. .......... 62/407 |
| 2006/0179868 | A1 | * | 8/2006 | Yoon et al. ............ 62/324.6 |
| 2006/0201168 | A1 | * | 9/2006 | Kates ............... 62/129 |
| 2006/0242974 | A1 | * | 11/2006 | Meister .............. 62/204 |
| 2007/0095084 | A1 | * | 5/2007 | Park et al. ............ 62/197 |

* cited by examiner

*Primary Examiner*—Duane S Smith
*Assistant Examiner*—Minh-Chau T Pham
(74) *Attorney, Agent, or Firm*—Carlson, Gaskey & Olds

(57) ABSTRACT

A bypass factor of an evaporator is used to indicate when an air filter of an HVAC is clogged. The bypass factor represents the amount of air that is bypassed without direct contact with the evaporator. As the air filter clogs, the bypass factor decreases. The bypass factor can also be used for early detection of clogging of the air filter. A first bypass factor is calculated by using the temperature measurements, and a second bypass factor is calculated by using the airflow rate of the air. The difference between the two bypass factors determines the error. An increase in the error indicates that the air filter is clogged. A coefficient of performance of the evaporator can also be calculated to detect if the air filter is clogged. A decrease in the coefficient of performance indicates that the air filter is clogged.

31 Claims, 2 Drawing Sheets

METHOD FOR DETECTING A FAULT IN AN HVAC SYSTEM

BACKGROUND OF THE INVENTION

The present invention relates generally to a method for detecting a fault, such as a clogged air filter, in a HVAC system.

A fault in an HVAC system can have a negative effect on the HVAC system. The fault can be a sensor failure, low refrigerant charge, and clogging of an air filter. An air filter is commonly used in an HVAC system to prevent airborne particles from entering an area that is being cooled. Over time, the air filter can clog and must be replaced. If the air filter is clogged, fan power consumption increases and system capacity decreases.

Additionally, the compressor can possibly fail, the life of the equipment can decrease, and the system may have to be taken temporarily out of service.

In prior systems, a sensor is employed to detect when the air filter is clogged. When the sensor detects that the air filter is clogged, an alarm is activated. There are several drawbacks to employing a sensor to detect a clogged air filter. For one, they are costly. Additionally, the design of the air filter may need to be modified to accommodate the sensors.

Other sensors are also generally utilized in the HVAC system to detect the pressure and the temperature of the refrigerant entering and exiting the compressor, the temperature of the refrigerant entering and exiting the evaporator, and the temperature of the air entering the evaporator.

Prior art fault detecting techniques are generally insensitive to variations in air concentration that occur when the air filter is clogged and the load of the system. Therefore, these techniques are only applicable to HVAC systems having a constant load that is supplied by a fixed speed fan.

Therefore, the present invention provides a method for detecting a fault in a HVAC system that overcomes the drawbacks and shortcomings of the prior art.

SUMMARY OF THE INVENTION

A vapor compression system operates in a cooling mode to provide cool air to an area. Refrigerant is compressed to a high pressure in a compressor and is cooled in a condenser. The cooled refrigerant is expanded to a low pressure in an expansion device. After expansion, the refrigerant flows through the evaporator and accepts heat from the air, cooling the air that is provided to the area. The refrigerant then returns to the compressor, completing the cycle.

An air filter blocks airborne particles from entering the area that is cooled. If particles clog the air filter, the airflow rate into the area decreases. A bypass factor of the evaporator is used to determine when the air filter is clogged. The bypass factor represents the amount of air that is bypassed without direct contact with the evaporator. When the air filter is clogged, the bypass factor decreases. An alarm is generated when the bypass factor decreases below a threshold value to provide an alert that the air filter is clogged.

The bypass factor can also provide early detection of air filter clogging. A first bypass factor is calculated by using the temperature measurements, and a second bypass factor is calculated by using the airflow rate of the air. The difference between the two bypass factors determines the error. As the error increases, this indicates that the air filter is beginning to clog.

The coefficient of performance of the evaporator can also be calculated to detect if the air filter is clogged. A decrease in the coefficient of performance indicates that the air filter is beginning to clog.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
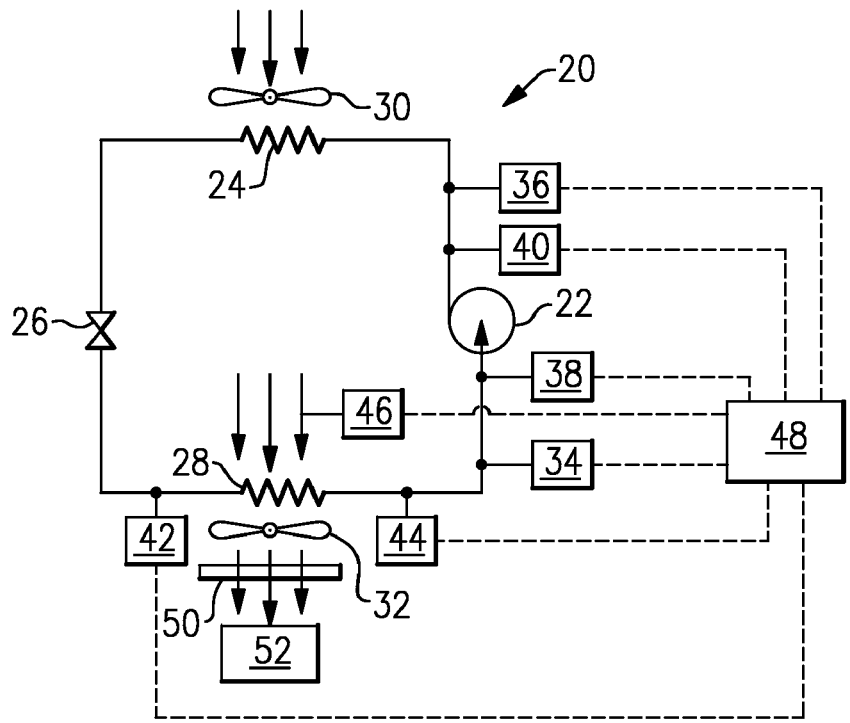
FIG. 1 illustrates a vapor compression system including sensors used to detect conditions of the air and the refrigerant flowing through the vapor compression system.

FIG. 1 illustrates a vapor compression system 20 including a compressor 22, a condenser 24, an expansion device 26, and an evaporator 28. Refrigerant circulates though the closed circuit vapor compression system 20.

When the vapor compression system 20 is operating in a cooling mode, the refrigerant exits the compressor 22 at a high pressure and a high enthalpy and flows through the condenser 24. In the condenser 24, the refrigerant rejects heat to a fluid medium, such as water or air, and is condensed into a liquid that exits the condenser 24 at a low enthalpy and a high pressure. If the fluid medium is air, a fan 30 is employed to direct the fluid medium over the condenser 24. The cooled refrigerant then passes through the expansion device 26, and the pressure of the refrigerant drops. After expansion, the refrigerant flows through the evaporator 28. In the evaporator 28, the refrigerant accepts heat from air, exiting the evaporator 28 at a high enthalpy and a low pressure. A fan 32 blows the air over the evaporator 28, and the cooled air is then used to cool an area 52.

When the vapor compression system 20 is operating in a heating mode, the flow of the refrigerant is reversed using a four-way valve (not shown). When operating in the heating mode, the condenser 24 operates as an evaporator, and the evaporator 28 operates as a condenser.

Figure 2:
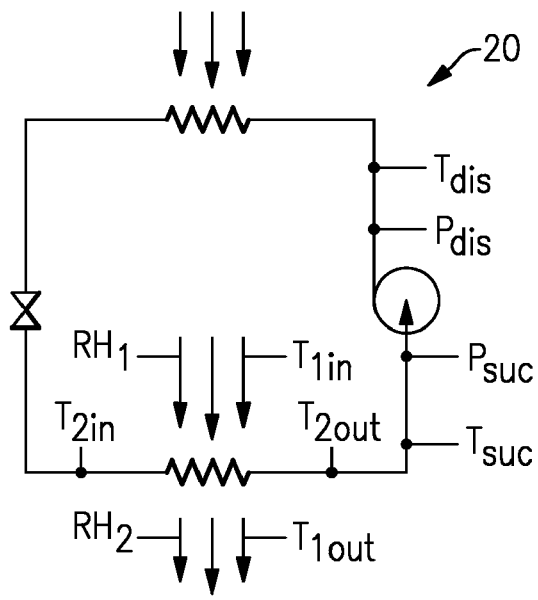
FIG. 2 illustrates the vapor compression system showing the sensed values detected in the vapor compression system.

As shown in FIG. 2, several variables in the vapor compression system 20 can be detected or sensed when monitoring operation of the vapor compression system 20. The variables are 1) the compressor suction temperature $T_{suc}$, 2) the compressor discharge temperature $T_{dis}$, 3) the compressor suction pressure $P_{suc}$, 4) the compressor discharge pressure $P_{dis}$, 5) the inlet temperature of the refrigerant entering the evaporator 28 $T_{2in}$, 6) the outlet temperature of the refrigerant exiting the evaporator 28 $T_{2out}$, 7) the inlet temperature of the air entering the evaporator $T_{1in}$, 8) the outlet temperature of the air exiting the evaporator $T_{1out}$, 9) the relative humidity of the air entering the evaporator $RH_1$, and 10) the relative humidity of the air exiting the evaporator $RH_2$.

Returning to FIG. 1, the vapor compression system 20 includes a sensor 34 that detects the compressor suction temperature $T_{suc}$, a sensor 36 that detects the compressor discharge temperature $T_{dis}$, a sensor 38 that detects the compressor suction pressure $P_{suc}$, a sensor 40 that detects the compressor discharge pressure $P_{dis}$, a sensor 42 that detects the inlet temperature of the refrigerant entering the evaporator $T_{2in}$, a sensor 44 that detects the outlet temperature of the refrigerant exiting the evaporator $T_{2out}$, and a sensor 46 that detects the inlet temperature of the air flowing into the evaporator $T_{1in}$. The sensors 34, 36, 38, 40, 42, 44 and 46 all communicate with a control 48.

A bypass factor BPF of the evaporator 28 represents the amount of air that is bypassed without direct contact with the coil of the evaporator 28. The bypass factor BPF depends upon the number of fins in a unit length of the coil (the pitch of the coil fins), the number of rows in the coil in the direction of airflow, and the velocity of the air. The bypass factor BPF of the coil decreases as the fin spacing decreases and the number of rows increases. The bypass factor BPF is defined as:

$$BPF = \frac{T_{1out} - T_s}{T_{1in} - T_s} \text{ when the evaporator 28 is a cooling coil} \quad \text{(Equation 1)}$$

$$BPF = \frac{T_s - T_{1out}}{T_s - T_{1in}} \text{ when the evaporator 28 is a heating coil} \quad \text{(Equation 2)}$$

The saturation temperature of the air is represented by the variable $T_s$. The saturation temperature of the air $T_s$ is approximately equal to the saturation temperature of the refrigerant. The saturation temperature of the refrigerant is calculated using the compressor suction pressure $P_{suc}$ and the refrigerant property. The refrigerant property is a known value that depends on the type of refrigerant used. Typically, the bypass factor BPF is less than 0.2.

An air filter 50 is used to block airborne particles from entering the area 52 that is cooled by the evaporator 28. If particles clog the air filter 50, the airflow rate into the area 52 decreases, causing the outlet temperature of the air exiting the evaporator $T_{1out}$ to approach the saturation temperature of the refrigerant. When this occurs, the bypass factor BPF approaches zero. Therefore, the bypass factor BPF of the evaporator 28 can be used to indicate when the air filter 50 is clogged.

The calculated bypass factor BPF is compared to a predetermined threshold. If the bypass factor BPF is less than the threshold, an alarm is generated to indicate that the air filter 50 is clogged. In one example, the threshold is set to be zero.

However, the bypass factor BPF of the evaporator 28 can also vary depending on the load demand in the area 52. If the load demand is high, more air needs to be delivered to the area 52, increasing the bypass factor BPF. If the load demand is low, less air needs to be delivered to the area 52, decreasing the bypass factor BPF. Therefore, the threshold has to be selected for the lowest possible load demand so that the clogging of the air filter 50 can be reliably detected. To compensate for any variations in the load demand, the bypass factor BPF can be normalized. A normalized bypass factor bpf is calculated by using the following equation:

$$bpf = \frac{BPF}{n} \quad \text{(Equation 3)}$$

where n is the speed of the fan 32. The speed n of the fan 32 is related to the load demand, and therefore the speed n of the fan 32 can be used to calculate the normalized bypass factor bpf. As the load demand increases, the speed n of the fan 32 increases to deliver more air into the area 52. By dividing the bypass factor BPF by the speed n of the fan 32, the bypass factor BPF can be adjusted to take into account changes in the load demand. The clogging of the air filter 50 can be determined using the existing sensors 34, 36, 38, 40, 42, 44 and 46 without having to employ a sensor to determine clogging of the air filter 50. The normalized bypass factor bpf is then used to detect clogging of the air filter 50. When the normalized bypass factor bpf is below the threshold, an alarm is generated to indicate that the air filter 50 is clogged.

However, at times it may be necessary to detect that the air filter 50 is just beginning to become clogged to provide an early indication of air filter 50 clogging and to allow time for the air filter 50 replacement to be scheduled.

In a first method of early detection, the bypass factor BPF is determined by both using the temperature measurements and the airflow rate. The difference between the two bypass factors BPF defines an error θ. As the error θ begins to increase, this indicates that the air filter 50 is beginning to clog. This can provide an early alert that the air filter 50 is beginning to clog.

Figure 3:
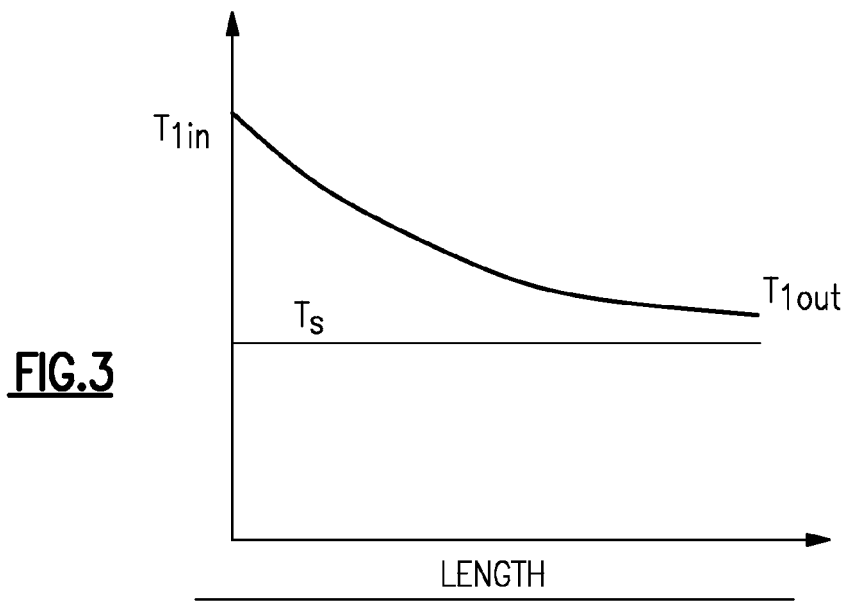
FIG. 3 illustrates a graph showing the temperature of the air flowing over an evaporator as the air travels through the evaporator.

FIG. 3 illustrates a graph showing the temperature of the air as it passes over the coil of the evaporator 28. As the air travels over and along the length of the coil of the evaporator 28, the temperature of the air exiting the evaporator $T_{1out}$ decreases almost to the saturation temperature of the air $T_s$.

The heat transfer rate of the evaporator 28 is defined as:

$$Q = UA \times LMTD \quad \text{(Equation 4)}$$

The rate of heat transfer is represented by the variable Q (W). The variable U represents the overall heat transfer coefficient (W/m$^2$K), and the variable A represents the surface area of the coil of the evaporator 28. The logarithmic mean temperature difference is represented by the variable LMTD, which is defined as:

$$LMTD = \frac{T_{1in} - T_{1out}}{\log_e\left(\frac{T_{1in} - T_s}{T_{1out} - T_s}\right)} \quad \text{(Equation 5)}$$

Equation 1 can be inserted into Equation 5, and the variable logarithmic mean temperature difference is defined as:

$$LMTD = \frac{T_{1in} - T_{1out}}{\log_e\left(\frac{1}{BPF}\right)} \quad \text{(Equation 6)}$$

The heat transfer rate Q can also be calculated using the airflow rate (the load demand) using the following equation:

$$Q = \frac{m_1 c_{P1}(T_{1in} - T_{1out})}{SHR} \quad \text{(Equation 7)}$$

In this equation, $m_1$ represents the mass flow rate of air (kg/s), $c_{p1}$ represents the specific heat of dry air (J/kgK) and SHR represents the sensible heat ratio. In the heating mode, the sensible heat ratio SHR is approximately equal to 1. The inlet temperature of the air flowing into the evaporator $T_{1in}$ and the outlet temperature of the air flowing out of the evaporator $T_{1out}$ are in Celsius (°C.).

When using Equation 6 in the cooling mode, the specific heat $c_{p1}$ should be constant. However, if the air is moist, the specific heat is not constant. Therefore, in the cooling mode, the equivalent dry bulb temperature of the air entering the evaporator $T'_{1in}$ and the equivalent dry bulb temperature of the air exiting the evaporator $T'_{1out}$ need to be calculated for the purpose of compensating the variations in specific heat.

Figure 4:
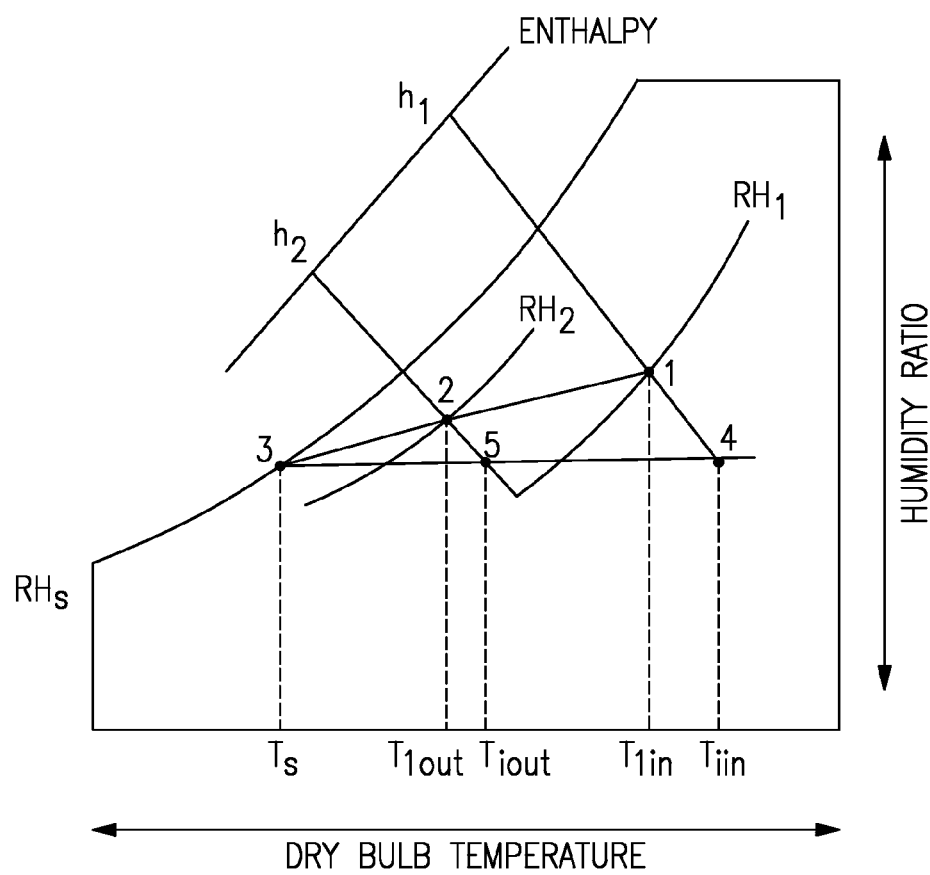
FIG. 4 illustrates a psychrometric chart showing the procedure for estimating the dry bulb temperature of the air entering and exiting the evaporator.

FIG. 4 shows a psychometric chart used to determine the dry bulb temperature of the air entering the evaporator $T'_{1in}$ and the dry bulb temperature of the air exiting the evaporator $T'_{1out}$. The dry bulb temperature is on the horizontal axis, and the humidity ratio is on the vertical axis.

Point 1 represents the inlet air condition and point 2 represents the outlet air condition. Point 1 is located on the enthalpy line of the air entering the evaporator $h_1$, and point 2 is located on the enthalpy line of the air exiting the evaporator $h_2$. A line that connects point 1 and point 2 can be extended to intersect a saturation curve RHs at point 3. Point 3 represents the saturation condition of the outdoor air. A horizontal line is drawn from point 3 that intersects the enthalpy lines $h_1$ and $h_2$. Point 4 located at the intersection of the enthalpy line of the air entering the evaporator $h_1$ and the horizontal line represents the equivalent dry air temperature of the air entering the evaporator $T'_{1in}$, and point 5 at the intersection of the enthalpy line of the air exiting the evaporator $h_2$ and horizontal line represents the equivalent dry air temperature of the air exiting the evaporator $T'_{1out}$.

Using the equivalent dry bulb temperatures $T'_{1in}$ and $T'_{1out}$ obtained by the psychometric chart, the heat transfer equations can be rewritten as:

$$Q = m_1 c_{p1}(T'_{1in} - T_s) \quad \text{(Equation 8)}$$

$$Q = UA \times LMTD \quad \text{(Equation 9)}$$

Using Equation 6, the logarithmic mean temperature difference LMTD can be calculated:

$$LMTD = \frac{T_{1in} - T_{1out}}{\log_e\left(\frac{1}{BPF}\right)} \quad \text{(Equation 10)}$$

Using Equations 8, 9 and 10, the bypass factor BPF can be calculated:

$$BPF = e^{-\frac{UA}{c_{p1} m_1}} \quad \text{(Equation 11)}$$

Equation 11 uses the airflow rate of the air passing over the evaporator 28 to determine the bypass factor BPF. The airflow rate is a function of the speed n of the fan 32. This function can be established from the fan data provided by the manufacturer, or from tests carried in the lab.

The bypass factor can also be calculated using the temperature measurements. The bypass factor BPF is defined as:

$$BPF = \frac{T'_{1out} - T_s}{T'_{1in} - T_s} \quad \text{(Equation 12)}$$

Using Equations 11 and 12, the error θ, or the difference between the two bypass factors BPF, can be calculated:

$$\theta = \left| \frac{T'_{1out} - T_s}{T'_{1in} - T_s} - e^{-\frac{UA}{c_{p1} m_1(n)}} \right| \quad \text{(Equation 13)}$$

When a new air filter 50 is installed in the vapor compression system 20, the error θ is approximately zero. Over time as the air filter 50 become clogged, the relationship between the speed n of the fan 32 and the airflow rate changes. This causes the bypass factor BPF calculated with equation 11 to change, increasing the error θ. When the error θ is greater than a threshold, an alarm is generated to indicate that the air filter 50 soon needs to be changed. Therefore, the clogging of the air filter 50 can be determined at an early stage.

The bypass factor BPF can also be used to detect other types of faults. For example, the fault can be low refrigerant charge or a malfunction of one of the sensors 34, 36, 38, 40, 42, 44 and 46 in the vapor compression system 20. For example, low refrigerant charge causes the value UA to change. This would effect the bypass factor BPF calculated with equation 11, causing the error θ to increase when using equation 13. Additionally, malfunction of one of the sensors 34, 36, 38, 40, 42, 44 and 46 causes the bypass factor BPF calculated with equation 12 to change, causing the error θ to increase when using equation 13.

In a second method of early detection, the coefficient of performance COP of the evaporator 28 is calculated to determine if the air filter 50 is beginning to clog. The coefficient of performance COP is defined as a ratio between the rate of heat transfer Q and the fan power P:

$$COP = \frac{Q}{P} \quad \text{(Equation 14)}$$

The rate of heat transfer Q can be calculated by either using the airside conditions (Equation 9) or by using the temperature measurements (Equation 8).

Fan power P is defined as:

$$P = k n^3 \quad \text{(Equation 15)}$$

where n is the speed of the fan 32, and k is a constant determined by the physical structure of the fan 32 and the system resistance. The system resistance includes resistance items, such as air duct resistance, evaporator fan 32 resistance, and air filter 50 resistance. The parameter k can be estimated from manufacturer data. When the air filter 50 is clogged, the resistance increases, increasing k and causing the fan 32 to consume more power.

When the air filter 50 is clean, the coefficient of performance COP has a substantially constant value. As then air filter 50 clogs, the parameter k increases, causing the coefficient of performance COP to decrease. Therefore, a decrease in he coefficient of performance COP indicates that the air filter 50 beginning to clog.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of detecting a fault in a vapor compression system, the method comprising the steps of:
    calculating a bypass factor of an evaporator of a vapor compression system; and
    employing the bypass factor to detect a fault in the vapor compression system.

2. The method as recited in claim 1 further including the steps of:
    compressing a refrigerant to a high pressure in a compressor;
    cooling the refrigerant;
    expanding the refrigerant; and
    evaporating the refrigerant in the evaporator.

3. The method as recited in claim 1 wherein the bypass factor depends upon a number of fins of the evaporator, a number of rows in the evaporator, and a velocity of air.

4. The method as recited in claim 1 wherein the bypass factor depends on a temperature of air entering the evaporator, a temperature of the air exiting the evaporator, and a saturation temperature of a refrigerant that exchanges heat with the air in the evaporator.

5. The method as recited in claim 1 further including the step of filtering air that exchanges heat with a refrigerant in the evaporator with a filter, wherein the fault is clogging of the filter.

6. The method as recited in claim 1 further including the steps of comparing the bypass factor to a threshold and generating an alarm when the bypass factor is less than the threshold.

7. The method as recited in claim 1 further including the steps of normalizing the bypass factor and blowing air over the evaporator with a fan having a speed, wherein the step of normalizing includes dividing the bypass factor by the speed of the fan.

8. The method as recited in claim 1 further including the steps of calculating a first bypass factor and a second bypass factor and determining a difference between the first bypass factor and the second bypass factor to calculate a system error.

9. The method as recited in claim 8 wherein the system error indicates the fault when the system error is greater than a threshold.

10. The method as recited in claim 8 wherein the first bypass factor depends on a temperature of air entering the evaporator, a temperature of the air exiting the evaporator, and a saturation temperature of the refrigerant and the second bypass factor depends on a heat transfer rate of the air.

11. The method as recited in claim 1 wherein the fault is one of low refrigerant charge and sensor fault.

12. The method as recited in claim 1 wherein a coefficient of performance of the evaporator detects the fault.

13. The method as recited in claim 12 further including the step of blowing air over the evaporator with a fan, wherein the coefficient of performance is defined as a heat transfer rate of the air divided by a power of the fan.

14. A method of detecting a clogged filter in a vapor compression system, the method comprising the steps of:
    compressing a refrigerant to the high pressure in a compressor;
    cooling the refrigerant;
    expanding the refrigerant;
    evaporating the refrigerant in an evaporator;
    calculating a bypass factor of the evaporator of the vapor compression system, wherein the bypass factor depends on a temperature of air entering the evaporator, a temperature of the air exiting the evaporator, and a saturation temperature of the refrigerant that exchanges heat with the air in the evaporator; and
    employing the bypass factor to detect the clogged filter in the vapor compression system.

15. The method as recited in claim 14 further including the steps of comparing the bypass factor to a threshold and generating an alarm when the bypass factor is less than the threshold.

16. The method as recited in claim 14 further including the steps of normalizing the bypass factor and blowing the air over the evaporator with a fan having a speed, wherein the step of normalizing includes dividing the bypass factor by the speed of the fan.

17. The method as recited in claim 14 further including the steps of calculating an additional bypass factor and determining a difference between the bypass factor and the additional bypass factor to calculate a system error.

18. The method as recited in claim 17 wherein the bypass factor depends on a temperature of the air entering the evaporator, a temperature of the air exiting the evaporator, and a saturation temperature of the refrigerant and the additional bypass factor depends on a heat transfer rate of the air.

19. A method of detecting a fault in a vapor compression system, the method comprising the steps of:
    calculating a coefficient of performance of an evaporator of a vapor compression system; and
    employing the coefficient of performance to detect a fault in the vapor compression system.

20. The method as recited in claim 19 further including the step of blowing air over the evaporator with a fan, wherein the coefficient of performance is defined as a heat transfer rate of the air divided by a power of the fan.

21. The method as recited in claim 1 wherein the bypass factor represents an amount of air that is bypassed without direct contact with a coil of the evaporator.

22. The method as recited in claim 1 wherein the fault is a clogged air filter.

23. The method as recited in claim 1 further including the steps of blowing air over a coil of the evaporator and filtering the air exiting the evaporator with an air filter.

24. The method as recited in claim 23 wherein the fault represents the air filter being clogged.

25. The method as recited in claim 14 wherein the bypass factor represents an amount of air that is bypassed without direct contact with a coil of the evaporator.

26. The method as recited in claim 14 wherein the filter is an air filter.

27. The method as recited in claim 26 further including the steps of blowing air over a coil of the evaporator and filtering the air exiting the evaporator with the air filter.

28. The method as recited in claim 27 wherein the fault represents the air filter being clogged.

29. The method as recited in claim 19 wherein further including the step of filtering air exiting the evaporator with an air filter.

30. The method as recited in claim 19 further including the steps of blowing air over a coil of the evaporator and filtering the air exiting the evaporator with an air filter.

31. The method as recited in claim 30 wherein the fault represents the air filter being clogged.

* * * * *

UNITED STATES PATENT AND TRADEMARK OFFICE
CERTIFICATE OF CORRECTION

| | |
|---|---|
| PATENT NO. | : 7,494,536 B2 |
| APPLICATION NO. | : 11/028805 |
| DATED | : February 24, 2009 |
| INVENTOR(S) | : Kang et al. |

Page 1 of 1

It is certified that error appears in the above-identified patent and that said Letters Patent is hereby corrected as shown below:

IN THE CLAIMS:

Claim 10, Column 7, Line 62: Change "the" to read as --a--

Claim 28, Column 9, Line 4: Change "the" to read as --a--

Signed and Sealed this

Twelfth Day of May, 2009

JOHN DOLL
*Acting Director of the United States Patent and Trademark Office*